US012779574B2

(12) United States Patent
Matsushima et al.

(10) Patent No.: US 12,779,574 B2
(45) Date of Patent: Nov. 3, 2026

(54) REMOTE OPERATION METHOD FOR REMOTE OPERATION WELDING SYSTEM, AND WELDING SYSTEM

(71) Applicant: Kobe Steel, Ltd., Kobe (JP)

(72) Inventors: Kohei Matsushima, Fujisawa (JP); Atsushi Fukunaga, Fujisawa (JP); Takeshi Koike, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 67 days.

(21) Appl. No.: 18/858,529

(22) PCT Filed: May 10, 2023

(86) PCT No.: PCT/JP2023/017640
§ 371 (c)(1),
(2) Date: Oct. 21, 2024

(87) PCT Pub. No.: WO2023/248639
PCT Pub. Date: Dec. 28, 2023

(65) Prior Publication Data

US 2025/0262680 A1 Aug. 21, 2025

(30) Foreign Application Priority Data

Jun. 20, 2022 (JP) ................................ 2022-099056

(51) Int. Cl.
*G06F 17/00* (2019.01)
*B23K 9/095* (2006.01)
(Continued)

(52) U.S. Cl.
CPC .......... *B23K 9/1087* (2013.01); *B23K 9/0956* (2013.01); *B25J 9/163* (2013.01);
(Continued)

(58) Field of Classification Search
CPC ...... B23K 9/1087; B23K 9/0956; B23K 9/10; B23K 9/12; B23K 9/127; B23K 37/00;
(Continued)

(56) References Cited

U.S. PATENT DOCUMENTS 8,653,412 B2 * 2/2014 Inada .................. B23K 9/0956
219/130.01
10,792,751 B2 * 10/2020 Kotera .................. B23K 9/126
(Continued)

FOREIGN PATENT DOCUMENTS

CN 115697647 B * 9/2025 ......... G05B 19/4155
JP 2002-96169 A 4/2002
(Continued)

OTHER PUBLICATIONS

A Robotic TIG System Built for Real Welding Production (Year: 2025).*
(Continued)

*Primary Examiner* — Ronnie M Mancho
(74) *Attorney, Agent, or Firm* — Oblon, McClelland, Maier & Neustadt, L.L.P.

(57) ABSTRACT

A remote operation method for a welding system enabling manual operation of a welding robot includes: capturing image data for a certain position using one or more imaging devices, displaying the image data using a display device, receiving, from an operator via an operation terminal, an instruction to execute a contact detection function by a welding torch of the welding robot, moving the welding torch during execution of the contact detection function on the basis of the instruction given to the welding robot and received via the operation terminal, and adjusting, if the welding torch has detected contact with a surrounding component by the contact detection function, the position of the welding torch on the basis of the position of contact.

9 Claims, 22 Drawing Sheets

(51) Int. Cl.
*B23K 9/10* (2006.01)
*B25J 9/16* (2006.01)
*B25J 11/00* (2006.01)

(52) U.S. Cl.
CPC ........... *B25J 9/1653* (2013.01); *B25J 9/1697* (2013.01); *B25J 11/005* (2013.01)

(58) Field of Classification Search
CPC ........ B25J 9/163; B25J 9/1653; B25J 9/1697; B25J 11/005; B25J 13/08; B25J 9/1689; B25J 19/02
USPC .......................................................... 700/245
See application file for complete search history.

(56) References Cited

U.S. PATENT DOCUMENTS

| | | | | |
|---|---|---|---|---|
| 11,628,575 B2 * | 4/2023 | Yoshida | B23K 9/0956 700/264 |
| 11,992,949 B2 * | 5/2024 | Aldridge | B23K 9/0953 |
| 2011/0108536 A1 * | 5/2011 | Inada | B23K 9/1735 219/130.1 |
| 2013/0087542 A1 * | 4/2013 | Yoshima | B23K 9/0256 219/124.1 |
| 2019/0160577 A1 * | 5/2019 | Guymon | B23K 9/1062 |
| 2020/0368904 A1 * | 11/2020 | Aldridge | B23K 9/0953 |
| 2021/0060792 A1 * | 3/2021 | Yoshida | B23K 9/0956 |
| 2022/0055139 A1 * | 2/2022 | Pan | B23K 9/0956 |
| 2022/0063098 A1 * | 3/2022 | Aldridge | B25J 9/0081 |
| 2022/0331912 A1 * | 10/2022 | Ozaki | B23K 37/0282 |
| 2023/0321746 A1 * | 10/2023 | Matsuda | B23K 9/126 219/124.02 |

FOREIGN PATENT DOCUMENTS

| | | | |
|---|---|---|---|
| JP | 2010-89222 A | | 4/2010 |
| JP | 2012200755 A | * | 10/2012 |
| JP | 2022-47287 A | | 3/2022 |

OTHER PUBLICATIONS

International Search Report issued Jul. 18, 2023 in PCT/JP2023/017640, filed May 10, 2023, 2 pages.

* cited by examiner

REMOTE OPERATION METHOD FOR REMOTE OPERATION WELDING SYSTEM, AND WELDING SYSTEM

TECHNICAL FIELD

The present invention relates to a remote operation method for remote operation welding system, and a welding system.

BACKGROUND ART

As a precondition to implement automatic operation and work of an articulated welding robot, it has been necessary for an operator to teach the robot in advance the positions, robot postures and welding conditions related to operations such as a welding operation, a sensing operation, and an operation of moving to a different work area. When welding is stopped due to an error at the time of automatic operation of a welding robot, an operator may manually perform correction work such as position adjustment.

Like this, when a welding robot system (hereinafter also referred to as a "welding system") including a welding robot is managed, an operator may need to manually operate (hereinafter also referred to as "manual operation") the welding robot. Meanwhile, depending on the welding environment, an operator may not be able to be close to the vicinity of the robot. In such an environment, a problem arises in that various types of work cannot be performed appropriately in a situation where a manual operation is needed, for example, in teaching work or correction work during welding.

To cope with the problem as mentioned above, the technique as in PTL 1 has been disclosed. PTL 1 discloses a technique that enables all teaching works and welding works to be remotely operated by an operator using an articulated welding robot to obtain a satisfactory welded portion even in an environment where a worker cannot be close to the welding robot or cannot stay nearby for a long time when teaching welding work, for example, in an environment of the nuclear reactor of a nuclear power plant.

CITATION LIST

Patent Literature

PTL 1: Japanese Unexamined Patent Application Publication No. 2002-96169

SUMMARY OF INVENTION

Technical Problem

As in PTL 1, even in an environment where a worker cannot be close to the welding robot, a manual operation is made possible by performing remote operation while checking image data captured using a CCD (Charge Coupled Device) camera attached to the distal end of the welding robot. However, the number of installable visual sensors such as CCD cameras is limited in a welding environment, and blind spots may occur. For example, for high-quality welding, extremely delicate work such as target positioning in the order of mm needs to be manually performed at the groove of a work (may be referred to as a base material or a workpiece). In PTL 1, only one visual sensor is attached to the distal end of the welding robot, thus many blind spots occur, and it is difficult to perform various works appropriately. In addition, a situation may occur in which depending on the posture and arrangement of the welding robot, the area of interest is difficult to be visually recognized from an image obtained by the visual sensor, or depending on the performance of the visual sensor, the area of interest cannot be obtained with sufficient clarity. When the welding torch is brought into contact with a surrounding component due to an incorrect operation of an operator, damage to the welding robot, for example, damage to the torch or wire bending may occur.

Therefore, a function of supporting the manual operation for a welding robot installed remotely while preventing damage to the welding robot has been called for.

It is an object of the present invention to provide a remote operation method for remote operation welding system and a welding system which enable an operator to appropriately perform various works when the operator manually operates a welding robot installed remotely.

Solution to Problem

In order to solve the above-described problem, the present invention has the following configuration. Specifically, a remote operation method for welding system enabling remote manual operation of a welding robot, the remote operation method comprising:

- a process of acquiring image data at any position using one or more imaging devices;
- a process of displaying the image data using a display device;
- a process of receiving, from an operator via an operation terminal, an instruction to execute a contact detection function by a welding torch of the welding robot; and
- an operation process of moving the welding torch during execution of the contact detection function based on the instruction given to the welding robot and received via the operation terminal.

When the welding torch detects contact with a surrounding component by the contact detection function in the operation process, a position of the welding torch is adjusted based on a position of the contact.

In addition, the present invention has the following configuration as another aspect. Specifically, a welding system comprising:

- a welding robot including a welding torch;
- one or more imaging devices;
- a display device; and
- an operation terminal for manually operating the welding robot remotely.

The welding system includes:

- an acquisition unit configured to acquire image data at any position using the one or more imaging devices;
- a display unit configured to display the image data using the display device;
- a receiving unit configured to receive, from an operator via the operation terminal, an instruction to execute a contact detection function by the welding torch; and
- an operation unit configured to move the welding torch based on an instruction to the welding robot received during execution of the contact detection function via the operation terminal.

When the welding torch detects contact with a surrounding component by the contact detection function, the operation unit adjusts a position of the welding torch based on a position of the contact.

Advantageous Effects of Invention

According to the present invention, it is possible to provide a support function for performing a manual operation of a welding system remotely.

DESCRIPTION OF EMBODIMENTS

Figure 1:
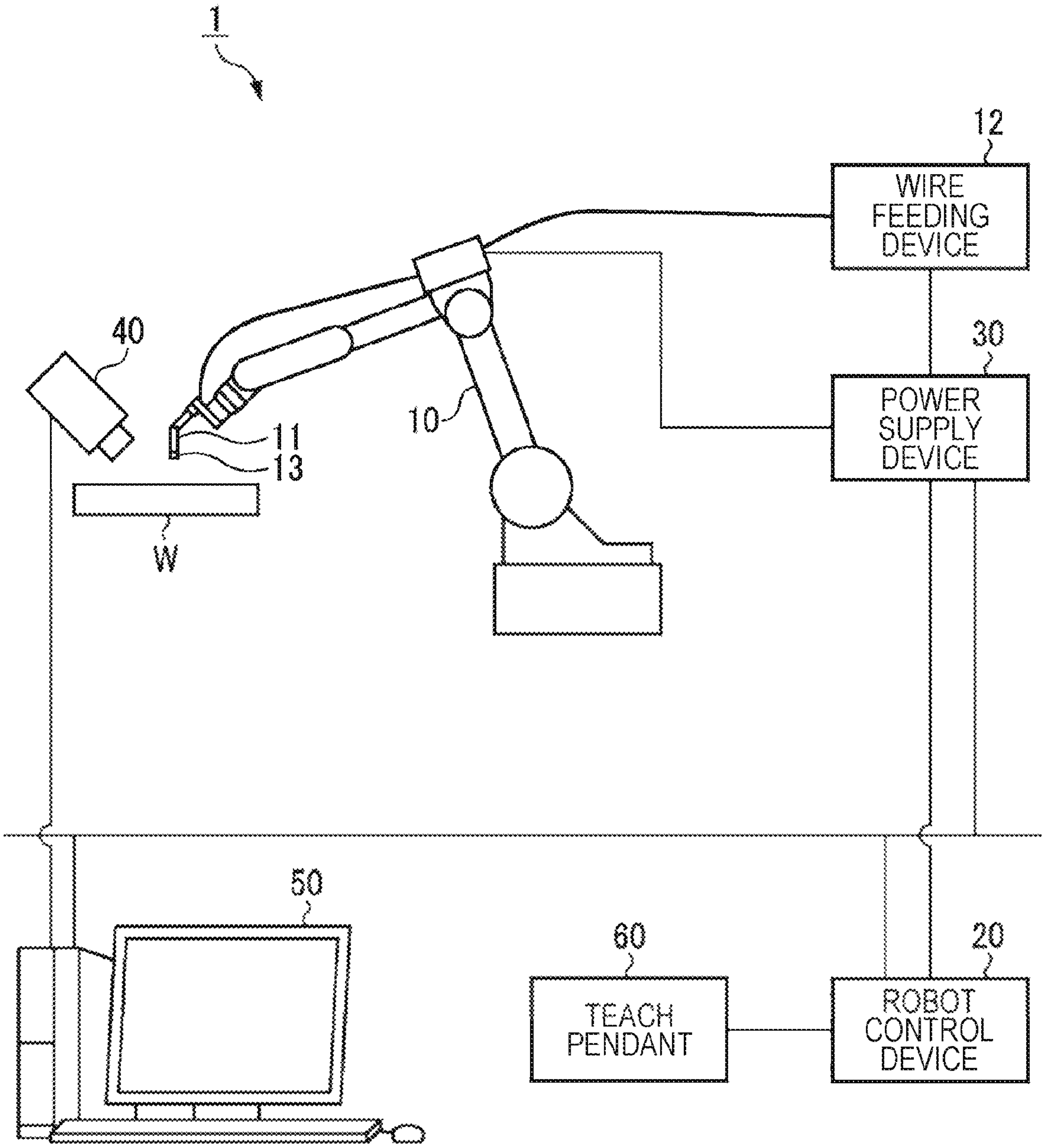
FIG. 1 is a schematic view illustrating an example of a system configuration according to an embodiment of the present invention.

In the following, an embodiment of the present invention will be described with reference to the drawings. Note that the embodiment described below is an embodiment for explaining the present invention, and it is not intended that the present invention be interpreted in a limited sense. All components described in each embodiment are not necessarily required components to solve the problem of the present invention. In the drawings, the same components are labeled with the same reference numerals to show correspondence relationship thereof.

The remote operation method and the remote operation welding robot system according to the present invention are useful not only for welding, but also for additive manufacturing technology utilizing GMAW, specifically, wire and arc additive manufacturing (WAAM). The term, additive manufacturing may be used as the term in lamination molding or rapid prototyping in a broad sense; however, in the present invention, the term is used in additive manufacturing in a unified manner. When the technique according to the present invention is applied to the additive manufacturing technology, "welding" is rephrased as "melt bonding", "additive manufacturing" or "lamination molding". For example, when the technique is treated as welding, "welding behavior" is used; however, when the present invention is utilized as additive manufacturing, "welding behavior" may be rephrased as "melt bonding behavior". When the technique is treated as welding, "welding system" is used; however, when the present invention is utilized as additive manufacturing, "welding system" may be rephrased as "additive manufacturing system".

[Configuration of Welding System]

FIG. 1 illustrates a configuration example of a welding system 1 according to the present embodiment. The welding system 1 illustrated in FIG. 1 includes a welding robot 10, a robot control device 20, a power supply device 30, a visual sensor 40, a data processing device 50, and a teach pendant 60. When the technique according to the present invention is applied to additive manufacturing, for example, the welding system 1 may be interpreted as an additive manufacturing system, and the welding robot 10 may be interpreted as a robot for additive manufacturing. In that case, depending on the system to be applied, a further component may be included.

The welding robot 10 illustrated in FIG. 1 is comprised of an articulated robot with six axes, and a welding torch 11 for GMAW is attached to the distal end thereof. Note that GMAW includes e.g., MIG (Metal Inert Gas) welding and NAG (Metal Active Gas) welding, and in the present embodiment, MAG welding will be described as an example. The welding robot 10 is not limited to the articulated robot with six axes, and for example, a portable small robot may be used.

From a wire feeding device 12, a welding wire 13 is supplied to the welding torch 11. The welding wire 13 is fed from the distal end of the welding torch 11 to a welding point. The power supply device 30 supplies electric power to the welding wire 13. Due to the electric power, an arc voltage is applied across the welding wire 13 and work W to generate an arc. The power supply device 30 is provided with a current sensor (not illustrated) that detects a welding current which flows during welding from the welding wire 13 to the work W, and a voltage sensor (not illustrated) that detects the arc voltage across the welding wire 13 and the work W.

The power supply device 30 includes a processor and a storage which are not illustrated. The processor is comprised of e.g., a CPU (Central Processing Unit). The storage is comprised of a volatile or non-volatile memory such as an HDD (Hard Disk Drive), a ROM (Read Only Memory) and a RAM (Random Access Memory). The processor controls the electric power to be applied to the welding wire 13 by executing a computer program for power supply control stored in the storage. The power supply device 30 is also connected to the wire feeding device 12, and the processor controls the feed speed and the feed amount of the welding wire 13.

The composition and type of the welding wire 13 may be selected according to the object to be welded. The type of the welding wire 13 may include e.g., solid wire and flux wire containing flux. The material for the welding wire 13 may include e.g., mild steel, stainless steel, aluminum, and titanium, and the wire surface may be plated with copper or the like. In addition, the diameter of the welding wire 13 is not limited to a specific value. In the present embodiment, as an example, a welding wire having an upper limit diameter of 1.6 mm and a lower limit diameter of 0.8 mm may be used.

The visual sensor 40 is comprised of e.g., a CCD (Charge Coupled Device) camera. The installation position of the visual sensor 40 is not limited to a specific position, and the visual sensor 40 may be directly attached to the welding robot 10, or may be fixed to a specific location in the surrounding as a surveillance camera. When the visual sensor 40 is directly attached to the welding robot 10, the visual sensor 40 is moved to capture the vicinity of the distal end of the welding torch 11 in coordination with the operation of the welding robot 10. The number of cameras included in the visual sensor 40 may be a plural number. For example, the visual sensor 40 may be formed using multiple cameras having different functions and installation positions.

In the present embodiment, the configuration using a fixed visual sensor 40 will be described as an example, the visual sensor 40 being installed in an environment where the welding robot 10 is utilized. When the visual sensor 40 is fixed to a location other than the welding robot 10, it is preferable to adopt a camera having at least PTZ functions as the visual sensor 40, and pan, tilt, and zoom may be controlled in coordination with the operation of the welding robot 10. Along with the operation of the welding robot 10, the visual sensor 40 may obtain the image of the distal end, as the work position, of the welding torch 11, and additionally, may obtain any image by an operator, as the user of the data processing device 50, specifying pan, tilt, zoom to check the range as a target, and providing direction on image capture settings. Specifically, it is preferable to obtain image data including at least one of the vicinity of the welding torch 11 of the welding robot or the vicinity of a weld line. The image capture settings include e.g., frame rate, the number of pixels in image, resolution, and shutter speed.

The data processing device 50 includes e.g., a CPU, a ROM, a RAM, a hard disk drive, an I/O interface, a communication interface, a video output interface, and a display unit (hereinafter also referred to as a display) which are not illustrated. The data processing device 50 may be comprised of e.g., an information processing device such as a PC (Personal Computer). The data processing device 50 can display at least video data captured in real time at any frame rate by the visual sensor 40 on a display by cooperation of the above-mentioned components. When the visual sensor 40 is a fixed surveillance camera as in the present embodiment, the data processing device **5*o* may further include a visual sensor controller. In addition, the data processing device 50 may be provided with an image processor that can change the brightness, contrast etc. of displayed video data, or provided with a storage that records and stores video. Note that a series of process from input of an image to real-time image display on a display may be performed by a software installed on the data processing device 50**.

The components included in the welding system 1 are communicably connected by various wired/wireless communication systems. The communication systems here are not limited to one type, and connection may be made by combining multiple communication systems.

[Configuration of Robot Control Device]

Figure 2:
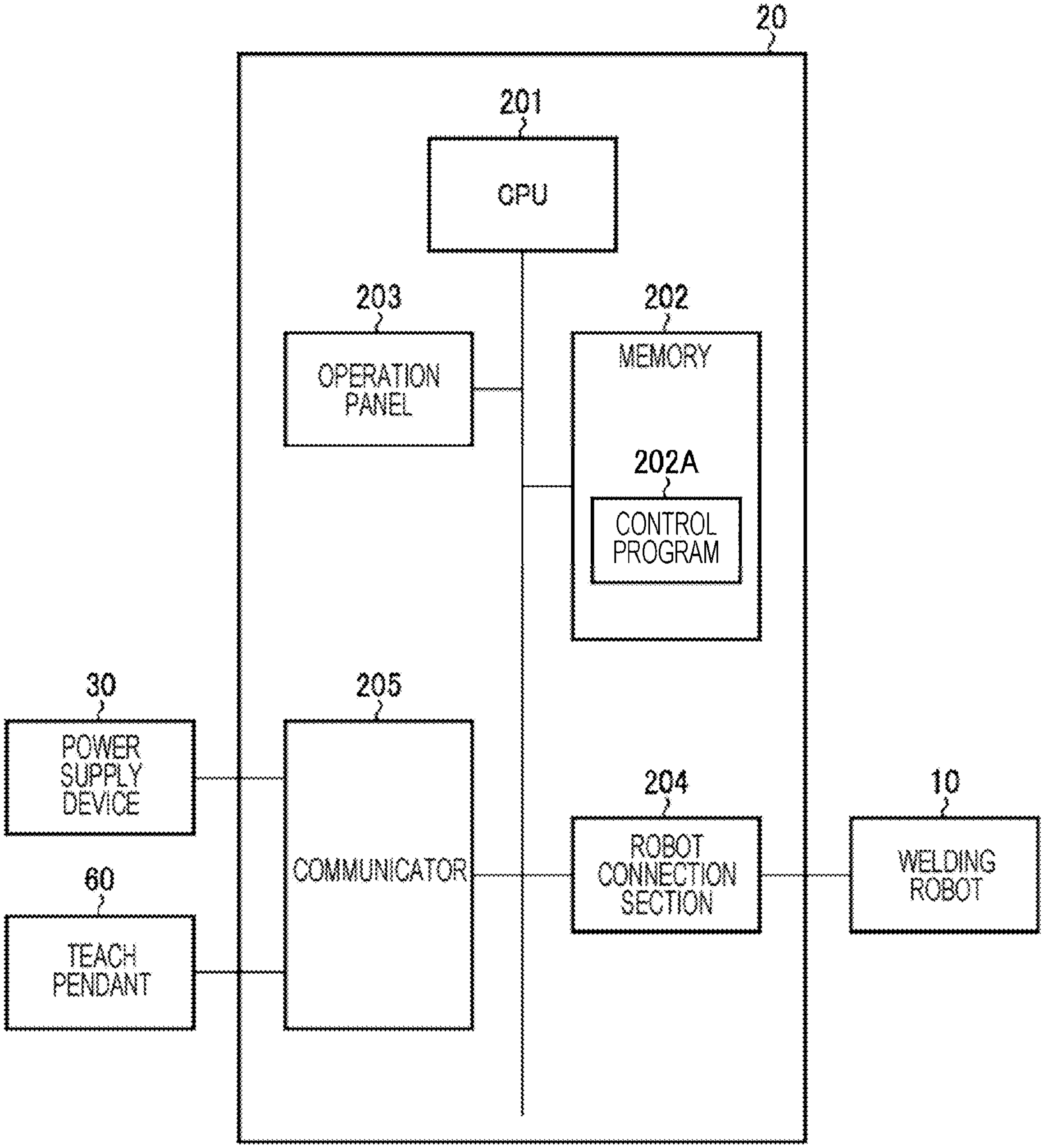
FIG. 2 is a block diagram illustrating a configuration example of a robot control device according to the embodiment of the present invention.

FIG. 2 illustrates a configuration example of the robot control device 20 that controls the operation of the welding robot 10. The robot control device 20 includes a CPU 201 that controls the entire device, a memory 202 that stores data, an operation panel 203 including multiple switches, a robot connection section 204, and a communicator 205. The memory 202 is comprised of a volatile or non-volatile storage device such as a ROM, a RAM, an HDD. The memory 202 stores a control program 202A used for control of the welding robot 10. The CPU 201 controls various operations of the welding robot 10 by executing the control program 202A.

For input of instructions to the robot control device 20, the operation panel 203 and the teach pendant 60 can be used, and primarily, the teach pendant 60 is utilized. The teach pendant 60 is coupled to the body of the robot control device 20 via the communicator 205. The operator can input a teaching program using the teach pendant 60. The robot control device 20 controls the welding robot 10 in accordance with the teaching program input from the teach pendant 60. Note that the teaching program can be automatically generated based on CAD (Computer-Aided Design) information using, for example, a computer which is not illustrated. The operation details defined in the teaching program are not limited to a specific one, and may vary with the specifications and welding method of the welding robot 10.

The teach pendant 60 enables manual operation of the welding robot 10 via the robot control device 20. In the present embodiment, a welding robot adopting a teaching-playback method is used. In this method, an operator manually operates the welding robot 10 to perform teaching works, such as providing teaching points on an operation line, a weld line of the welding robot 10 and storing the positions thereof, storing the coordinate information on the posture of the welding robot 10, and inputting a welding condition. Thus, the teaching program used for automatically operating the welding robot 10 is generated. When the welding robot 10 is stopped due to an error occurred in the middle of welding during automatic operation of the welding robot 10, an operator can perform correction work such as changing the target position by manually operating the welding robot 10 using the teach pendant 60.

The robot connection section 204 is connected to a drive circuit of the welding robot 10. The CPU 201 outputs a control signal based on the control program 202A to a drive circuit (not illustrated) included in the welding robot 10 via the robot connection section 204.

The communicator 205 includes a communication module for wired or wireless communication. The communicator 205 is used for communication of data and signals with the power supply device 30, the data processing device 50, and the teach pendant 60. The system and standard of communication used by the communicator 205 are not limited to specific ones, and multiple systems may be combined or a different system may be used for each device connected. From the power supply device 30, for example, the current value of a welding current detected by a current sensor (not illustrated), and the voltage value of an arc voltage detected by a voltage sensor (not illustrated) are given to the CPU 201 via the communicator 205.

The robot control device 20 also controls the travel speed and the extension direction of the welding torch 11 by the control of each axis of the welding robot 10. When a weaving operation is performed, the robot control device 20 also controls the weaving operation of the welding robot 10 according to the preset cycle, amplitude, and welding speed. The weaving operation refers to alternate swinging of the welding torch 11 in a direction intersecting with a travel direction of welding, i.e., a welding direction. The robot control device 20 performs weld line tracking control along with the weaving operation. The weld line tracking control is an operation of controlling the position on the right and left with respect to the travel direction of the welding torch 11 so that bead is formed along the weld line. In addition, the robot control device 20 also controls the feed speed of the welding wire 13 by controlling the wire feeding device 12 via the power supply device 30.

[Remote Operation Method]

In the present embodiment, a description will be given assuming that an operator utilizing the welding system 1 controls and teaches the remotely located welding robot 10 using the teach pendant 60 and the data processing device 50. In this case, the welding robot 10 and the visual sensor 40 are installed at a position away, i.e., remotely from an operator and the data processing device 50, and the operator visually recognizes an image of work W set in the vicinity of the welding robot 10 via the display of the data processing device 50, the image being captured by the visual sensor 40. The operator checks the image of the work W, thereby performing various operations while recognizing the positional relationship between the welding robot 10, particularly, the welding torch 11 and the work W.

In this process, the operator visually recognizes the work W and the welding robot 10 indirectly using the image captured by the visual sensor 40, thus as mentioned above, blind spots may occur or a situation may occur in which the object is hard to be visually recognized clearly. Particularly, in the case of fillet welding, the object is difficult to be visually recognized clearly, and it is difficult for the operator to grasp the welding position three-dimensionally. In the case of welding of a groove, in addition to the difficulty in clear visual recognition, blind spots may occur. In addition, although fine control is needed for the contact state between the vicinity of the distal end of the welding robot 10 and the work W, in a situation in which the object is hard to be visually recognized, the position of the distal end of the welding torch 11 is prevented from being finely adjusted without applying a load of contact more than necessary. As a result, in order to avoid contact with the welding torch 11, the distance between the work W and the welding torch 11 is provided more than necessary, thus teaching of an appropriate position of the welding torch 11 is not possible.

Thus, in the present embodiment, contact between the welding robot 10 and the work W is detected appropriately at the time of remote operation, and the convenience of teaching work by an operator is improved.

Figure 3:
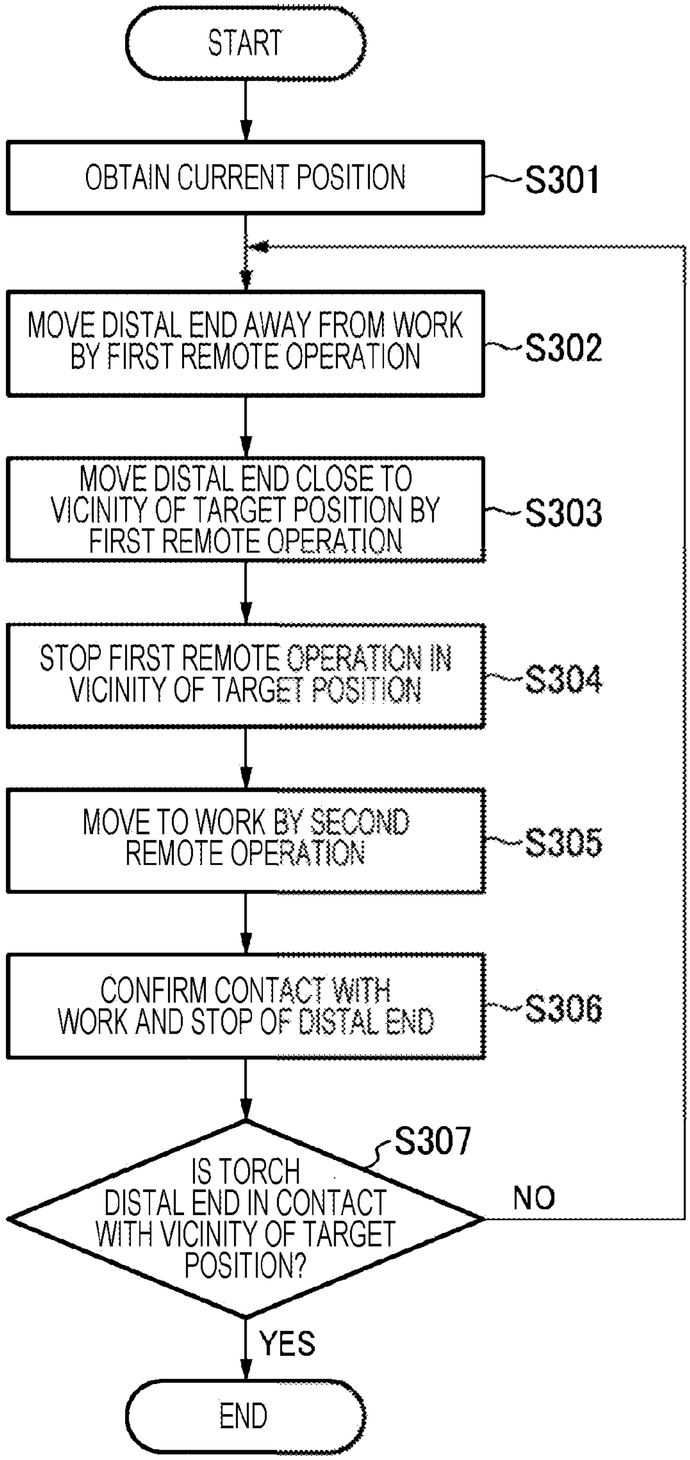
FIG. 3 is a flowchart of a sensing process according to the embodiment of the present invention.

FIG. 3 is a flowchart showing the flow of grasping the position on the work W related to welding by an operator at the time of remote operation. In this process, the robot control device 20 performs the process while receiving various operations by the operator via the teach pendant 60.

In S301, the operator grasps the current position of a predetermined part of the current welding robot 10 from an image displayed on the data processing device 50. Here, the predetermined part will be described using an example of the distal end of the welding torch 11. The distal end of the welding torch 11 referred to herein indicates the distal end position of the welding wire 13 which has been fed via the welding torch 11 and has a predetermined extension. First, the robot control device 20 applies electric power (hereinafter also referred to as "sensing voltage") for detection to the welding torch 11 or the welding wire 13. The robot control device 20 then moves the welding torch 11 in a predetermined direction to cause contact with the work W. The predetermined direction is based on the instructions to the teach pendant 60 by the operator. The contact of the work W with the welding wire 13 at the distal end of the welding torch 11 causes the operation of the welding robot 10 to be stopped, thus the positional relationship between the work W and the welding wire 13 is identified by the position of the welding wire 13.

In S302, the operator moves the welding torch 11 away from the work W. The distance and direction for moving away may be based on the instructions of the operator. Let "first remote operation" be the remote operation performed by the operator in a state where a sensing voltage is not being applied, and "second remote operation" be the remote operation performed by the operator in a state where a sensing voltage is being applied. The travel speed of the "first remote operation" is referred to as the "first travel speed", and the travel speed of the "second remote operation" is referred to as the "second travel speed". Therefore, the process of S301 is performed by the "second remote operation" based on the instructions of the operator, and the process of S302 is performed by the "first remote operation" based on the instructions of the operator.

For setting the "first travel speed" and the "second travel speed", different speed levels are provided in advance, and in the present embodiment, as the "first travel speed", any speed level can be selected from four predetermined speed levels "high", "middle", "intermediate low", and "low". Also, as the "second travel speed", any speed level can be selected by a numerical value 100 to 1 from predetermined "maximum speed" to "minimum speed". The "high" in the "first travel speed" corresponds to 100 in the "second travel speed", and the "low" corresponds to 3. As long as the setting is not changed, the "second travel speed" is 3 which is the same speed as the "low" in the "first travel speed". The second travel speed is preferably set lower than the first travel speed, at least the second travel speed is such a speed that can be decelerated to zero almost simultaneously with detection of a voltage change generated when contact between the welding torch 11 and the work W occurs. When a change in the voltage is detected, the robot control device 20 automatically switched to the "first remote operation".

In S303, the operator operates the welding robot 10 by the first remote operation via the teach pendant 60 based on any target position, and the current position obtained in S301 so that the distal end of the welding torch 11 approaches the target position.

In S304, the operator operates the teach pendant 60 to stop the welding torch 11 at the position where the distal end thereof is away from the target position by a certain distance. Here, the operator stops the first remote operation. The certain distance here may be determined at the discretion of the operator.

In S305, the operator uses the teach pendant 60 to switch to the second remote operation, and move the welding torch 11 to cause the distal end thereof to come into contact with the work W.

In S306, the robot control device 20 stops the operation with the distal end of the welding torch 11 in contact with the work W. At this point, the operator confirms that the welding torch 11 has come into contact the work W and stopped.

In S307, the operator determines whether the contact position at the distal end of the welding torch 11 is in a predetermined range from the target position. The predetermined range here may be determined as a range of acceptable error at the discretion of the operator. When the contact is not made in the predetermined range (NO in S307), the process by the operator is returned to S302, and the process is repeated. When the contact is made at a position in the predetermined range (YES in S307), the process flow is completed.

Figure 4A:
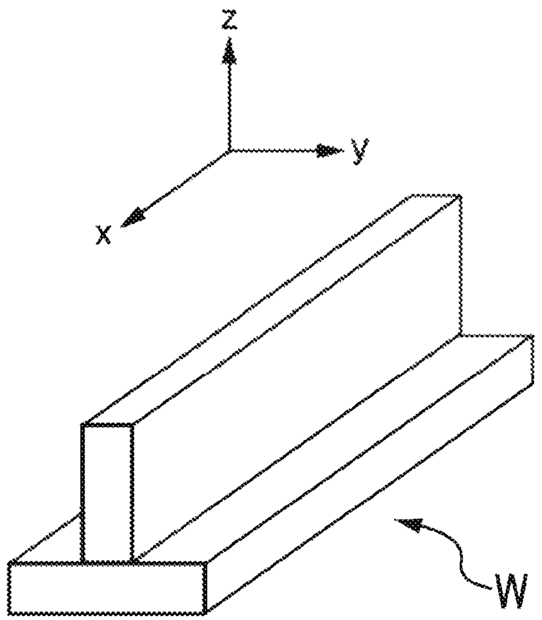
FIG. 4A is a conceptual view for explaining a series of flow of a welding torch for a remote operation according to the embodiment of the present invention.

Next, an operation example of the welding torch 11 in remote operation to which the sensing process is applied will be described. FIGS. 4A to 4L are views for explaining a series of operation flow of the welding torch 11 performed via instructions from the teach pendant 60 by the operator in the remote operation according to the present embodiment. FIGS. 4A to 4L each illustrate the positional relationship between the work W and the welding torch 11 with a view along the z-axis associated with a view along the x-axis. A specific description will be given with reference to FIGS. 4A to 4L according to the flow of the flowchart illustrated in FIG. 3. As illustrated in FIG. 4A, a description will be given using an example of the work W consisting of two members disposed to be perpendicular to each other.

Figure 4B:
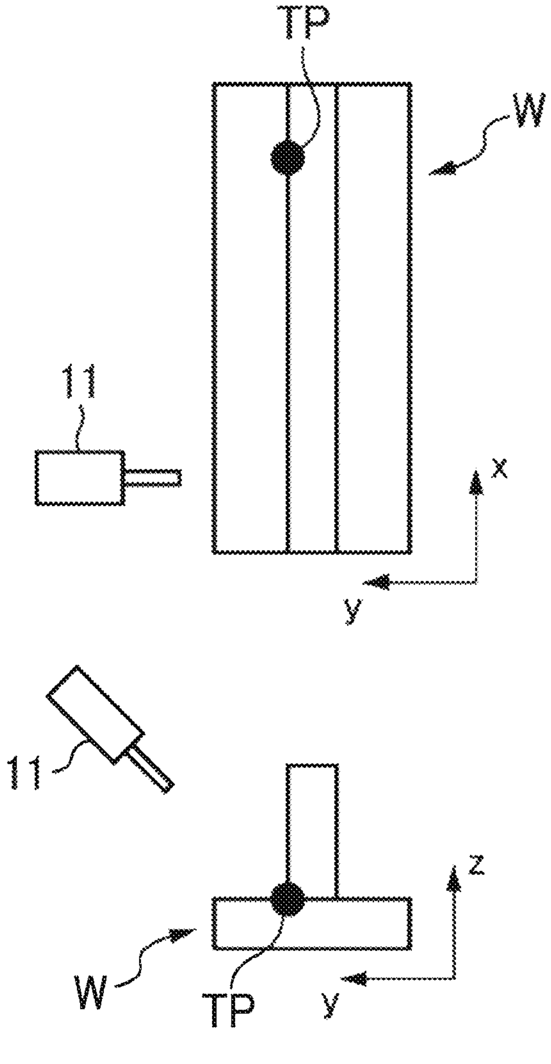
FIG. 4B is a conceptual view for explaining a series of flow of a welding torch for a remote operation according to the embodiment of the present invention.
Figure 4C:
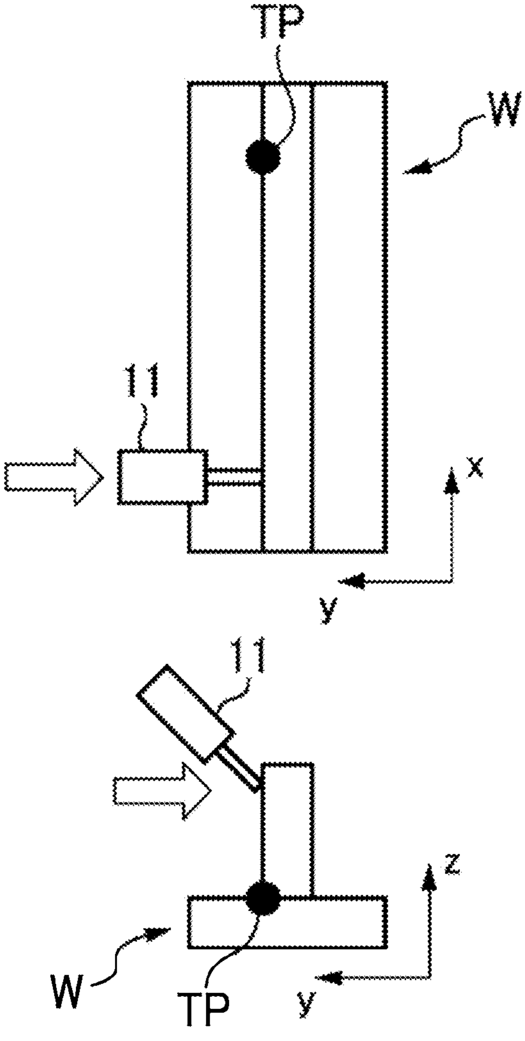
FIG. 4C is a conceptual view for explaining a series of flow of a welding torch for a remote operation according to the embodiment of the present invention.

FIG. 4B illustrates a state example before the start of the process of S301 of FIG. 3. First, as illustrated in FIG. 4C, in order to obtain the current position of the welding torch 11, the operator gives instructions to the robot control device 20 via the teach pendant 60 to cause the welding torch 11 to come into contact with the work W by the second remote operation. This corresponds to the process of S301 of FIG. 3. Here, an example has been illustrated in which the welding torch 11 is moved in the y-axis direction, but may be configured to be moved in another axis.

Figure 4D:
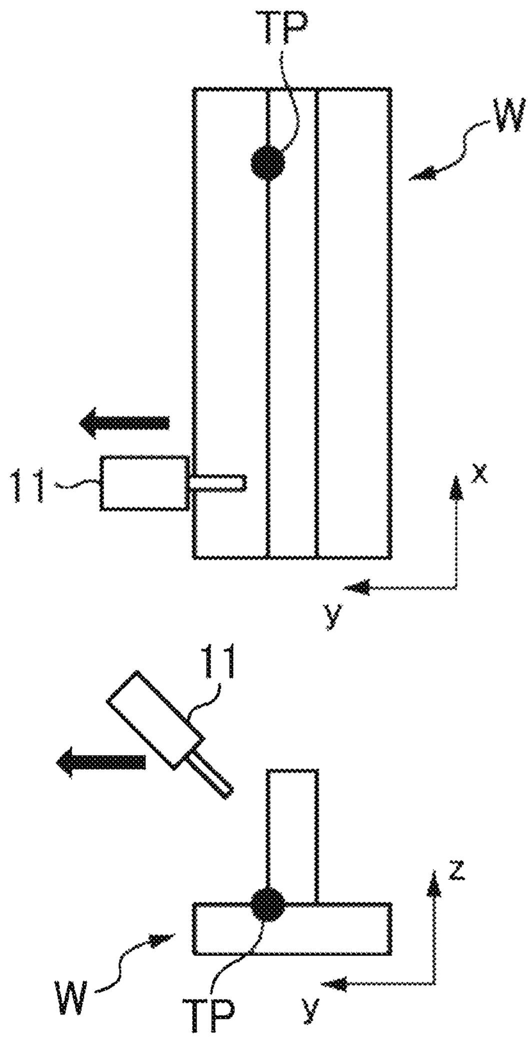
FIG. 4D is a conceptual view for explaining a series of flow of a welding torch for a remote operation according to the embodiment of the present invention.

Next, as illustrated in FIG. 4D, after contact between the distal end of the welding torch 11 and the work W, the sensing voltage is released, and switching is made to the first remote operation. Subsequently, the operator moves the welding torch 11 away from the work W. This corresponds to the process of S302 of FIG. 3. Here, an example is shown in which the direction of moving away is opposite to the direction in which the work W approaches in FIG. 4C.

Figure 4E:
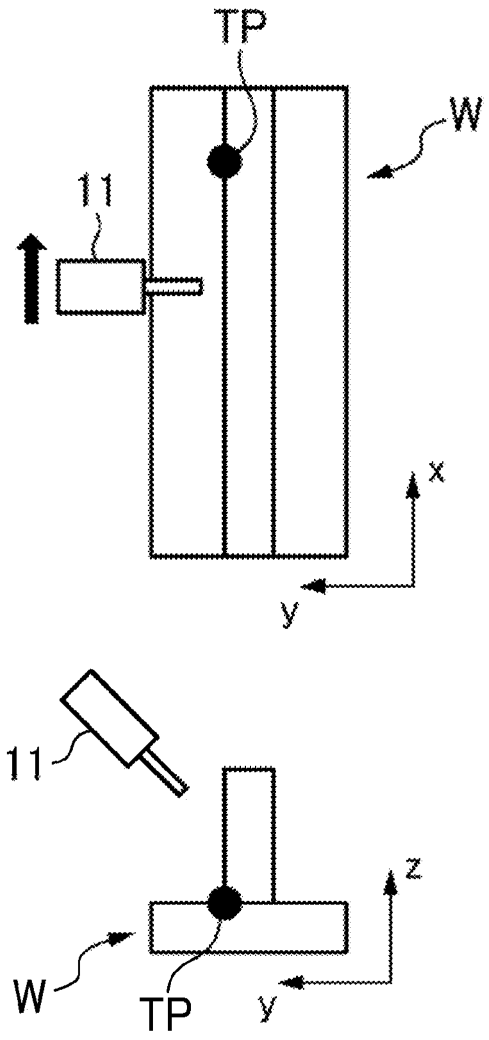
FIG. 4E is a conceptual view for explaining a series of flow of a welding torch for a remote operation according to the embodiment of the present invention.

Next, as illustrated in FIG. 4E, the operator moves the welding torch 11 in a direction closer to the target position by still the first remote operation via the teach pendant 60. This corresponds to the process of S303 of FIG. 3.

Figure 4F:
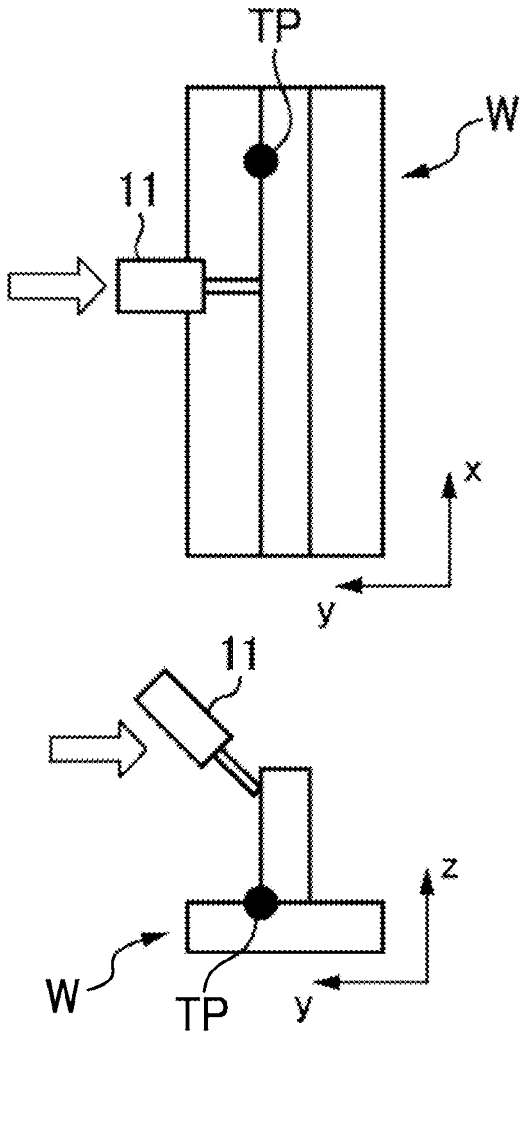
FIG. 4F is a conceptual view for explaining a series of flow of a welding torch for a remote operation according to the embodiment of the present invention.

Next, as illustrated in FIG. 4F, after moving the welding torch 11 by a predetermined distance, the operator switches to the second remote operation via the teach pendant 60, and moves the welding torch 11 to cause the distal end thereof to come into contact with the work W. This corresponds to the process of S 305 of FIG. 3. At this point, since the contact position between the work W and the welding torch 11 is not within a predetermined range from the target position (corresponding to NO in S307 of FIG. 3), the process is further repeated.

Figure 4G:
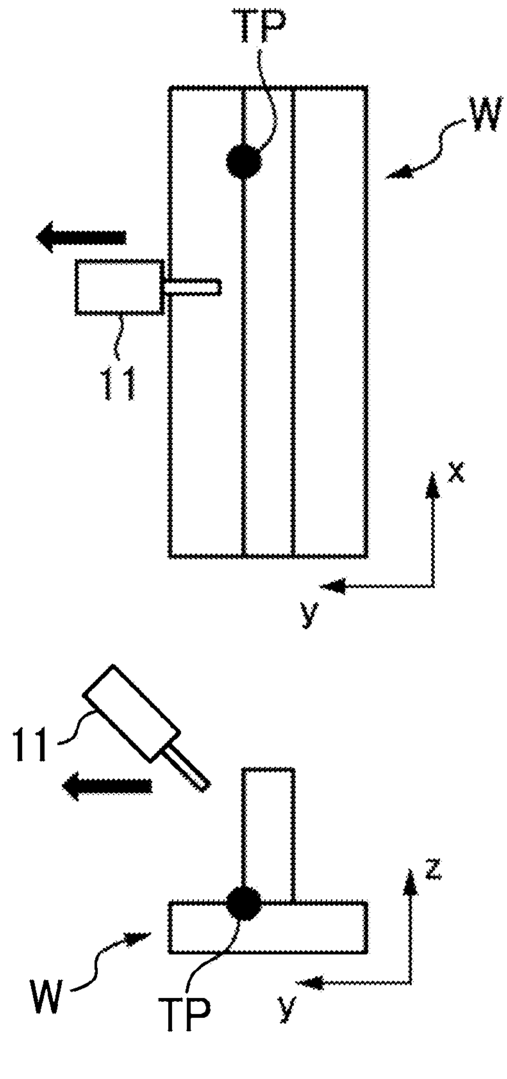
FIG. 4G is a conceptual view for explaining a series of flow of a welding torch for a remote operation according to the embodiment of the present invention.
Figure 4H:
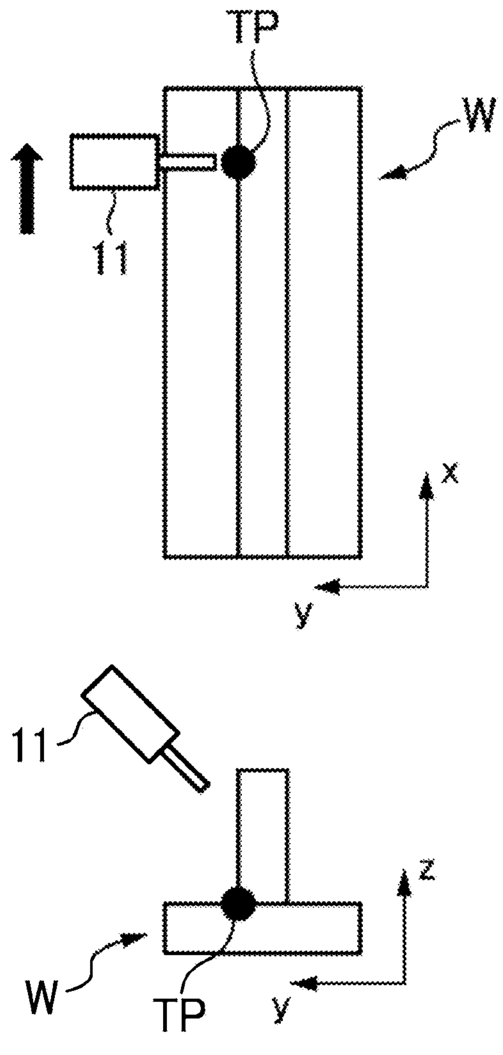
FIG. 4H is a conceptual view for explaining a series of flow of a welding torch for a remote operation according to the embodiment of the present invention.
Figure 4I:
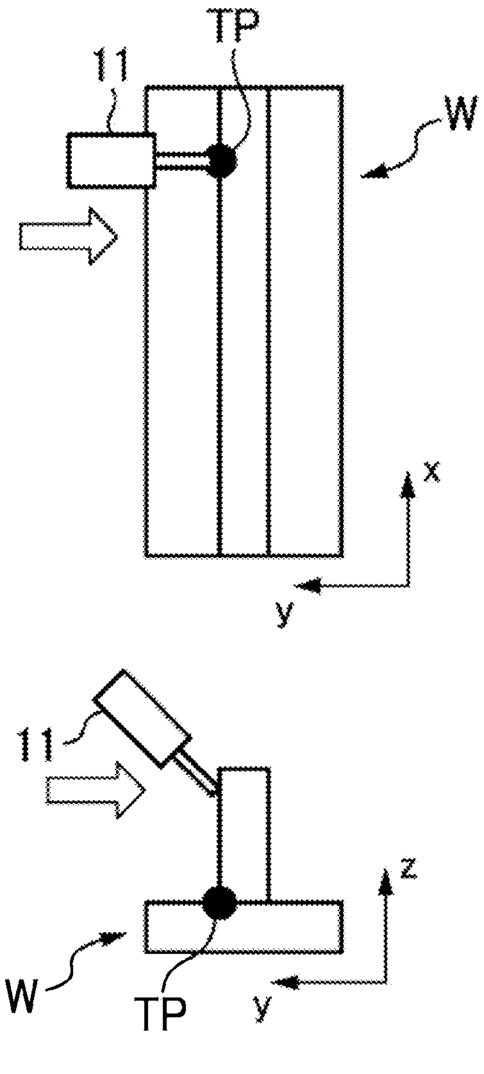
FIG. 4I is a conceptual view for explaining a series of flow of a welding torch for a remote operation according to the embodiment of the present invention.

FIG. 4G corresponds to the process of S302 repeated. Also, FIG. 4H corresponds to the process of S303 repeated. In addition, FIG. 4I corresponds to the process of S306 repeated. At this point, it is identified that the coordinates in the x-axis and the y-axis out of three axes, the x-axis, the y-axis, the z-axis match the target position. Meanwhile, in the z-axis direction, the contact position is not within a predetermined range from the target position (corresponding to NO in S307 of FIG. 3), the process is further repeated.

Figure 4J:
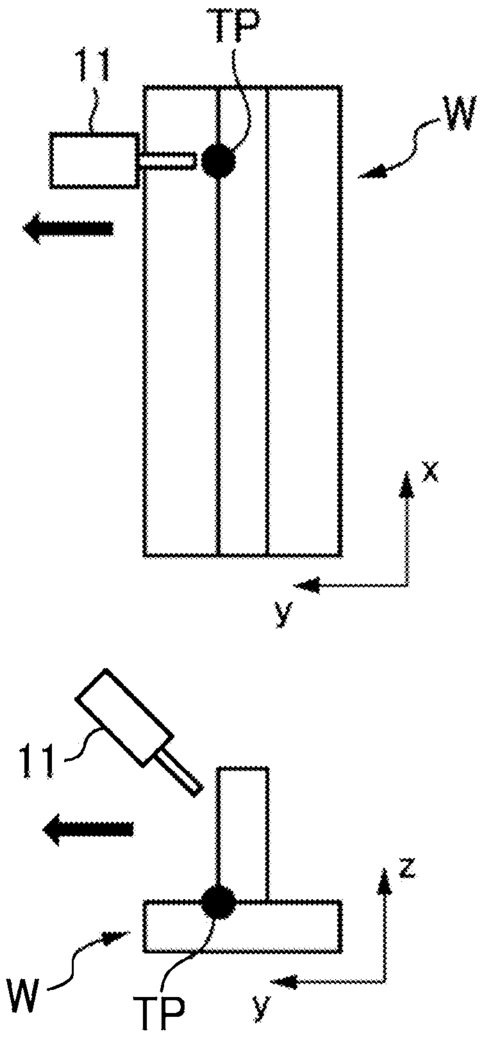
FIG. 4J is a conceptual view for explaining a series of flow of a welding torch for a remote operation according to the embodiment of the present invention.
Figure 4K:
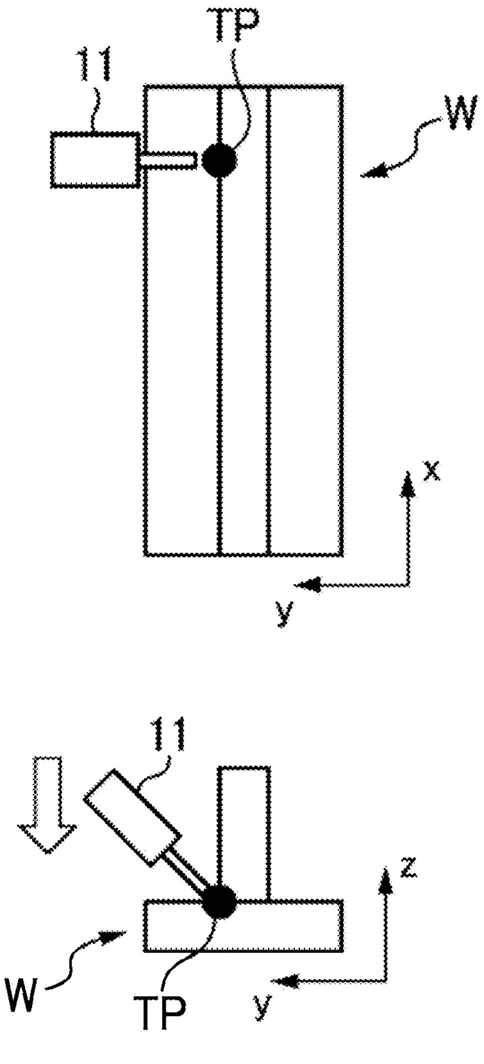
FIG. 4K is a conceptual view for explaining a series of flow of a welding torch for a remote operation according to the embodiment of the present invention.

FIG. 4J corresponds to the process of S302 further repeated. Next, FIG. 4K corresponds to the process of S303 further repeated. Since the position of the x-axis and the y-axis are already adjusted, the operator moves the welding torch 11 in a direction in which adjustment is not made, that is, in the z-axis direction in this example via the teach pendant 60 so as to approach the target position. The operator switches to the second remote operation in advance, and moves the welding torch 11 in a direction in which adjustment is not made.

Figure 4L:
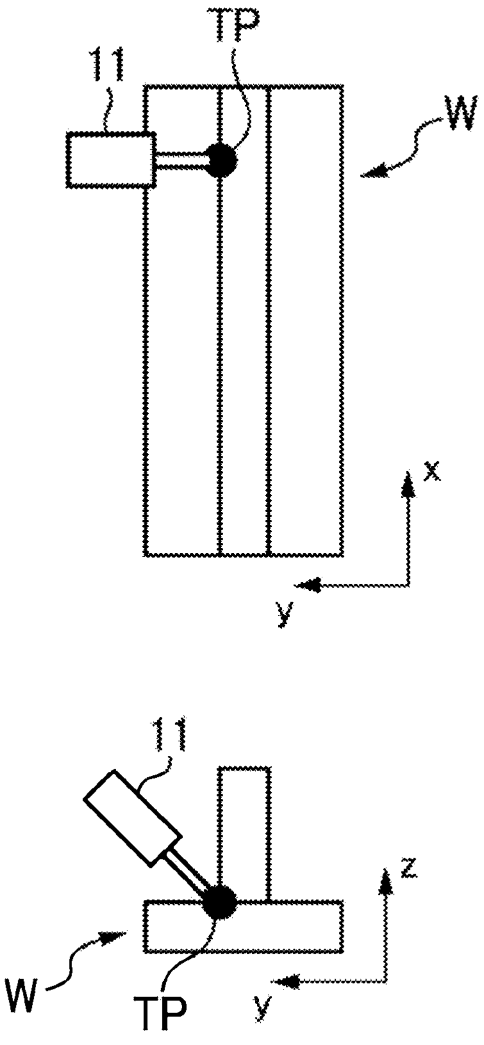
FIG. 4L is a conceptual view for explaining a series of flow of a welding torch for a remote operation according to the embodiment of the present invention.

As illustrated in FIG. 4L, when a contact state between the distal end of the welding torch 11 and the vicinity of the target position is achieved, remote adjustment operation by the operator is completed.

When the visual sensor 40 is disposed to capture the work W from the near-side direction of the weld line, for example, in the state of FIG. 4C and the state of FIG. 4F, the position of the welding torch 11 and the target position overlap in the image of the visual sensor 40, which presumably makes it difficult for the operator to visually recognize the target position. Depending on the performance, for example, the resolution of the visual sensor 40, the target position in the work W may not be able to be captured clearly, and in such a situation, presumably, it is difficult for the operator visually recognize the target position. As a result, when the operator makes a teaching program, it may be difficult to specify an appropriate target position. Thus, it is possible to provide a support function for making a teaching program with higher accuracy by causing the welding system 1 to perform the control as described above when the position on the work W is identified.

Figure 5:
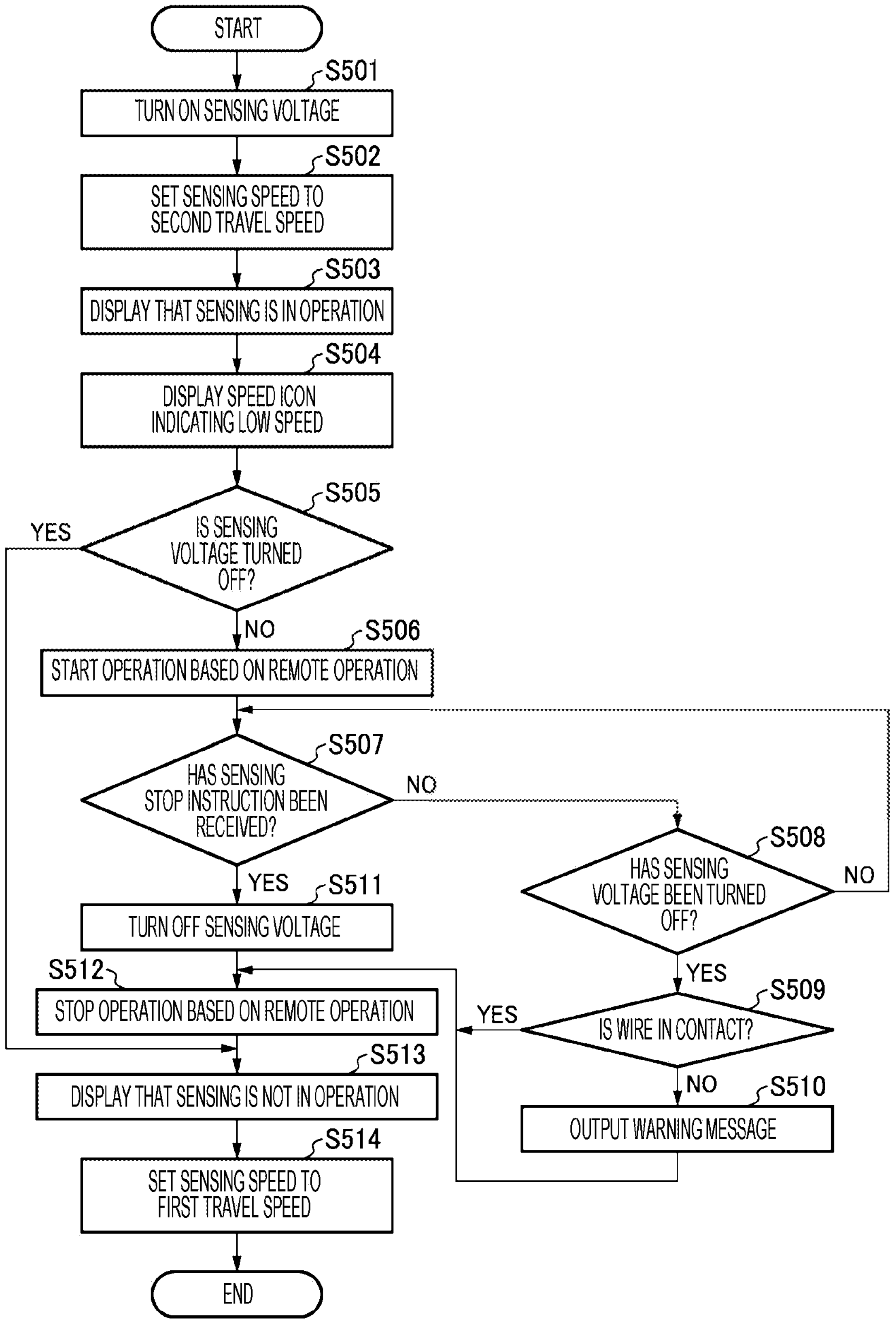
FIG. 5 is a flowchart of a sensing process according to the embodiment of the present invention.

FIG. 5 is a flowchart showing the flow of process to be performed by the robot control device 20 when the operator of the welding system 1 starts the "second remote operation" using the teach pendant 60. In other words, the present flowchart is executed by the robot control device 20 when the operator of the welding system 1 performs an operation to detect contact between the work W and the distal end of the welding torch 11 using the teach pendant 60. Therefore, the present flowchart may be executed in each of the processes in S301, S305, S306 illustrated in FIG. 3.

As described above, at the time of remote operation, an image around the welding torch 11 is captured by the visual sensor 40, and displayed on the display of the data processing device 50 as appropriate so that the operator can visually recognize the image. The image capture settings for the visual sensor 40 may be adjustable at the discretion of the operator.

In S501, when the operator starts the "second remote operation" using the teach pendant 60, the robot control device 20 applies a sensing voltage to detect contact at the distal end of the welding torch 11 based on instructions from the teach pendant 60. In the present embodiment, a touch sensor system is used for the second remote operation, and a voltage is applied across the work W and the welding wire 13 at the distal end of the welding torch 11, and phenomenon of voltage drop is utilized, which occurs when the welding wire 13 comes into contact with the work W. Consequently, the work position and groove position are detected. Note that the contact detection function is not limited to this, and it is possible to use a pressure sensor that detects contact by a pressure generated when contact between the welding torch and the base material occurs, and a voltage detection sensor that detects contact by a load voltage applied to a motor when contact between the welding torch and the base material occurs. Note that when the operator starts the contact detection function on the teach pendant 60, a sensing voltage may be continued to be applied across the work and at least one of the welding wire and a nozzle included in the welding torch until the contact detection function is terminated or contact between the welding torch and the base material occurs once.

In S502, the robot control device 20 sets the travel speed of the welding torch 11, i.e., the speed of the second remote operation to the second travel speed.

In S503, on a display (not illustrated) included in the teach pendant 60, the robot control device 20 displays that the second remote operation is being performed, specifically, the sensing operation is being performed. The display method here is not limited to a specific one, and for example, the color of an icon displayed on the display may be changed, or a message may be displayed.

In S504, on the display (not illustrated) included in the teach pendant 60, the robot control device 20 displays that the sensing operation is being performed at the low speed, that is, the second travel speed. The display method here is not limited to a specific one, and for example, an icon may be displayed in association with the icon displayed in S503.

In S505, the robot control device 20 determines whether the sensing voltage applied to the welding torch 11 has been turned OFF. In other words, the robot control device 20 determines whether the welding torch 11 and the work W are in contact with each other at the start of the sensing operation. When these are in contact with each other, the sensing voltage is OFF at this point. When the sensing voltage is OFF (YES in S505), the robot control device 20 stops application of the sensing voltage, and the process of the robot control device 20 proceeds to S513. Meanwhile, when the sensing voltage is ON (NO in S505), the process of the robot control device 20 proceeds to S506.

In S506, the robot control device 20 starts to move the welding torch 11 in response to reception of a remote operation by the operator via the teach pendant 60.

In S507, the robot control device 20 determines whether a sensing stop instruction has been received from the operator via the teach pendant 60 during the sensing operation. The sensing stop instruction may be made, for example, by releasing any button provided in the teach pendant 60. When the sensing stop instruction is received (YES in S507), the process of the robot control device 20 proceeds to S511. Meanwhile, when the sensing stop instruction is not received (NO in S507), the sensing operation is continued, and the process of the robot control device 20 proceeds to S508.

In S508, the robot control device 20 determines whether the sensing voltage applied to the welding torch 11 has been turned OFF. In other words, the robot control device 20 determines whether the welding torch 11 has come into contact with the work W. When these are in contact, the sensing voltage is OFF at this point. When the sensing voltage is OFF (YES in S508), the process of the robot control device 20 proceeds to S509. Meanwhile, when the sensing voltage is ON (NO in S508), the sensing operation is continued, and the process of the robot control device 20 returns to S507.

In S509, the robot control device 20 determines whether the welding wire 13 at the distal end of the welding torch 11 has come into contact with the work W. In the present embodiment, using the setting that the signal terminal to detect reduction in the sensing voltage varies with the position of contact, it is determined whether the welding wire 13 at the distal end of the welding torch 11 has come into contact with the work W, or whether a portion other than the welding wire 13 has come into contact with the work W. When the welding wire 13 has come into contact with the work W (YES in S509), the process of the robot control device 20 proceeds to S512. Meanwhile, when the welding wire 13 has not come into contact with the work W (NO in S509), an unexpected position on the welding torch 11 has come into contact with the work W, thus the process of the robot control device 20 proceeds to S510 in which a warning is issued. In the present embodiment, a state in which the sensing voltage is OFF, and the welding wire 13 and the work W are not in contact is presumably achieved when a nozzle part included in the welding torch 11 has come into contact with the work W. Even when a nozzle part comes into contact with the work W, the sensing voltage decreases, and the contact is detectable, which can be used as means to prevent damage to the torch.

In S510, the robot control device 20 displays a warning message on the display of the teach pendant 60. The detail of the warning message is not limited to a specific one, and may be a notification indicating that the work W and a portion other than the distal end of the welding torch 11 are in contact with each other.

In S511, the robot control device 20 turns OFF the sensing voltage.

In S512, the robot control device 20 stops the operation based on the remote operation.

In S513, on the display (not illustrated) included in the teach pendant 60, the robot control device 20 displays that the sensing operation is not being performed. The display here may be made by returning the display made in S503 to the original.

In 8514, the robot control device 20 sets the travel speed of the welding torch 11 to "low" of the first travel speed. The process flow is then completed.

As described above, each time instructions to start the "second remote operation" are given by the operator via the teach pendant 60, the process flow illustrated in FIG. 5 is executed from the start to the end. Therefore, the process flow is executable in each step illustrated in FIG. 3.

Thus, the present embodiment makes it possible to provide a function of supporting the manual operation for a welding robot installed remotely while preventing damage to the welding robot.

[Modification 1]

A modification will be described in which the support function related to the remote operation shown in the embodiment is applied when the details of a teaching program manually generated are adjusted, or updated. As the target position on the work W, the teaching point specified in a teaching program will be described as an example. The welding robot 10 and the visual sensor 40 are installed at a position away, i.e., remotely from an operator and the data processing device 50, and the operator visually recognizes an image of the work W set in the vicinity of the welding robot 10 via the display of the data processing device 50, the image being captured by the visual sensor 40. The operator then adjusts the parameters of the teaching program by operating the teach pendant 60 while checking the image of the work W.

For example, teaching programs already generated are being universally utilized for various welding systems. Since the mechanical error for each welding system and deviation of the installation position of the work may occur, the parameters of the teaching program need to be adjusted in this environment. In this situation, adjustment of the parameters by remote operation can be facilitated using the above-described support function according to the embodiment.

Figure 6:
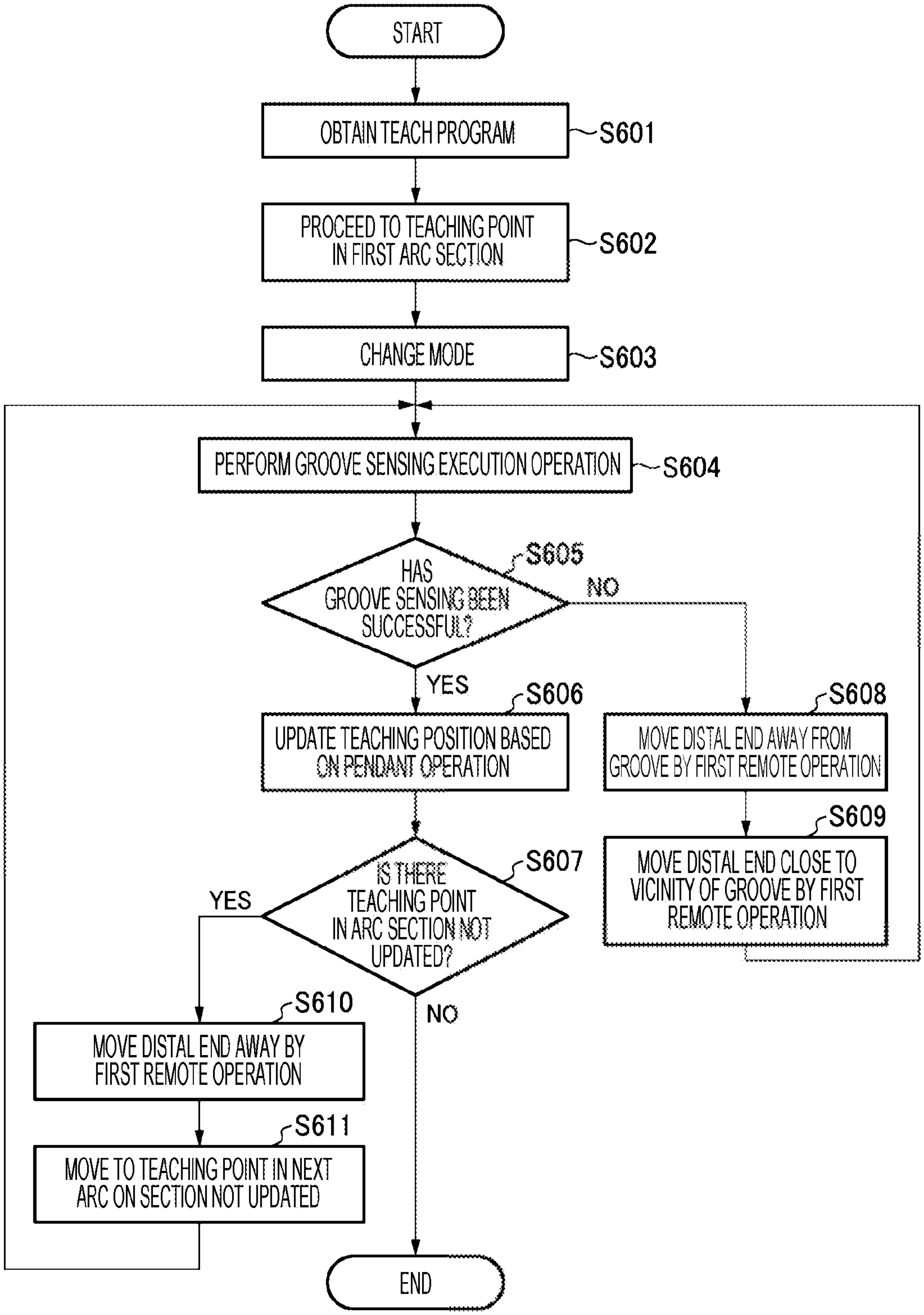
FIG. 6 is a flowchart of an adjustment process for a teaching program according to the embodiment of the present invention.

FIG. 6 illustrates a flowchart for an adjustment process for the position parameters of the teaching program in this example. Here, an example of detecting the position of the groove of the work W, and adjusting the teaching position will be described.

In S601, the robot control device 20 obtains a teaching program. A teaching program may be obtained in such a manner that a teaching program already generated is read from the location specified by an operator. Alternatively, a teaching program directly input by an operator may be obtained.

In S602, the robot control device 20 moves the welding torch 11 to a first teaching point of the section for welding specified in the teaching program generated in S601.

In S603, the operator switches the mode via the teach pendant 60. The mode here corresponds to the mode specifically for the process to be applied when the details of the above-mentioned teaching program manually generated are adjusted, or updated. At this point, the robot control device 20 may notify the operator via the display of the teach pendant 60 that the mode has been switched.

In S604, the robot control device 20 receives, via the teach pendant 60, an execution operation for sensing (hereinafter referred to as groove sensing) the groove position. The robot control device 20 starts the groove sensing based on the received operation. In this process, the sensing operation based on the groove shape is automatically performed based on the instructions by the operator via the teach pendant 60. Note that the sensing operation based on the groove shape may be operated by the operator. The robot control device 20 attempts to move the distal end of the welding torch 11 to a central position of the groove while detecting contact with the vicinity of the groove. The move of the groove to the central position may be such that the welding torch 11 is moved based on a movement pattern defined in advance, and is automatically controlled so as to approach the central position depending on the contact situation.

In S605, the operator determines whether the groove sensing has been successful. Successful groove sensing indicates a case where the distal end of the welding torch 11 is located at the groove center at the teaching point of current interest. The distal end of the welding torch 11 referred to herein indicates the distal end position of the welding wire which has been fed via the welding torch 11 and has a predetermined extension. When the groove sensing has been successful (YES in S605), the process of the operator proceeds to S606. Meanwhile, when the operator determines that the groove sensing has been unsuccessful, specifically, the distal end is not located at a central position of the groove at the teaching point of interest, or determines in the middle of groove sensing that even if a series of groove sensing operation based on the groove shape is continued till the end, the distal end of the robot cannot be located at a central position of the groove (NO in S605), the process of the operator proceeds to S608.

In S606, the operator updates the target central position of the groove as the teaching position via the teach pendant 60. Subsequently, the process of the operator proceeds to S607.

In S607, the operator determines whether any unprocessed teaching point in the section for welding is left in the teaching program generated in S601. When any unprocessed teaching point is left (YES in S607), the flow proceeds to S610. When no unprocessed teaching point is left (NO in S607), the process flow is completed. At this point, the mode may be automatically returned to the previous mode switched in S603, or the mode may be maintained until instructions from the operator are received.

In S608, the operator moves the distal end of the welding torch 11 away from the vicinity of the groove by the first remote operation via the teach pendant 60. The process of the operator then proceeds to S609.

In S609, the operator causes the distal end of the welding torch 11 to move closer to the vicinity of the groove by the first remote operation. The movement here may be based on instructions by the operator via the teach pendant 60, or may be set according to the positions and shape of the groove detected so far. The process of the operator is then returned to S604, and the sensing operation for the groove at the teaching point of current interest is repeated.

In S610, the operator moves the distal end of the welding torch 11 away by the first remote operation via the Leach pendant 60.

In S611, the operator moves the distal end of the welding torch 11 to the vicinity of the next unprocessed teaching point by the first remote operation via the teach pendant 60. The process of the operator is then returned to S604 and repeated.

A specific description will be given with reference to FIGS. 7A to 7C according to the flow of the flowchart illustrated in FIG. 6. Here, a description will be given using an example of the work W in which a groove is provided between two members, and a backing material is disposed on the backside of the groove as illustrated in FIG. 7A.

Figure 7A:
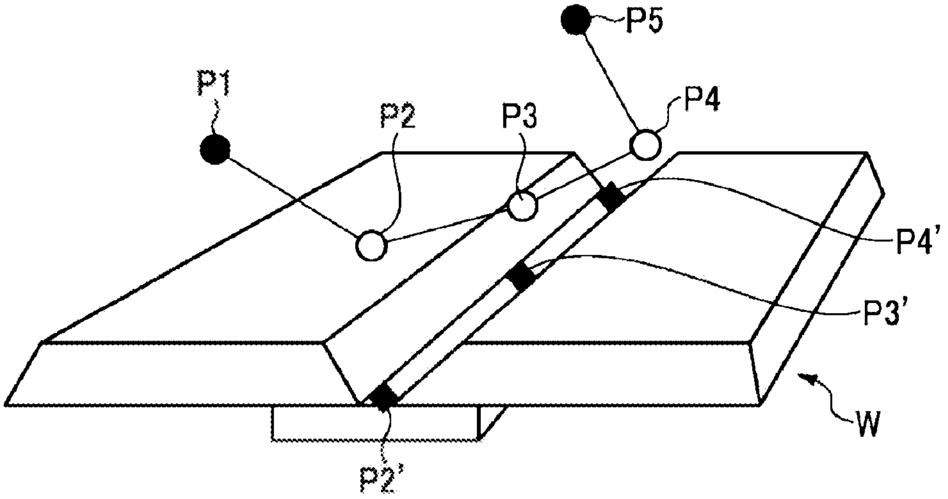
FIG. 7A is a conceptual view for explaining an adjustment process for a teaching program according to the embodiment of the present invention.
Figure 7B:
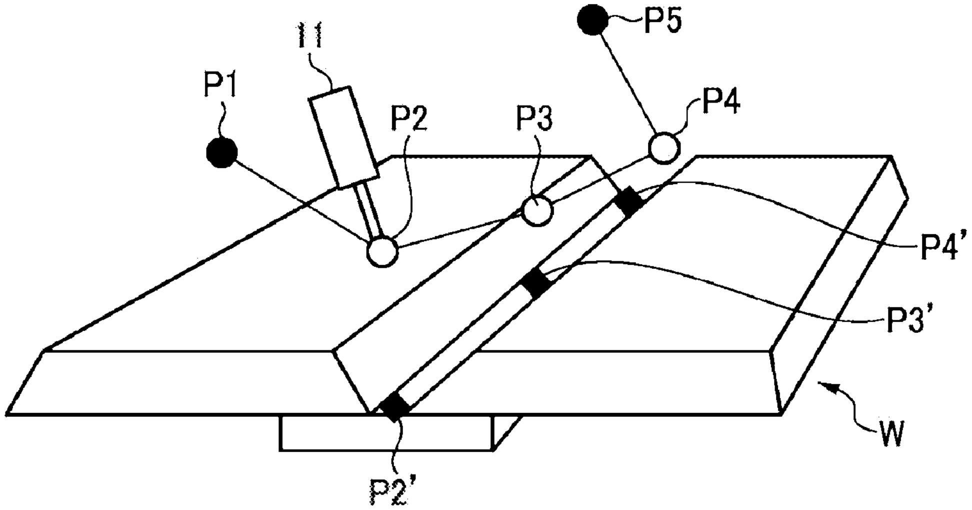
FIG. 7B is a conceptual view for explaining an adjustment process for the teaching program according to the embodiment of the present invention.
Figure 7C:
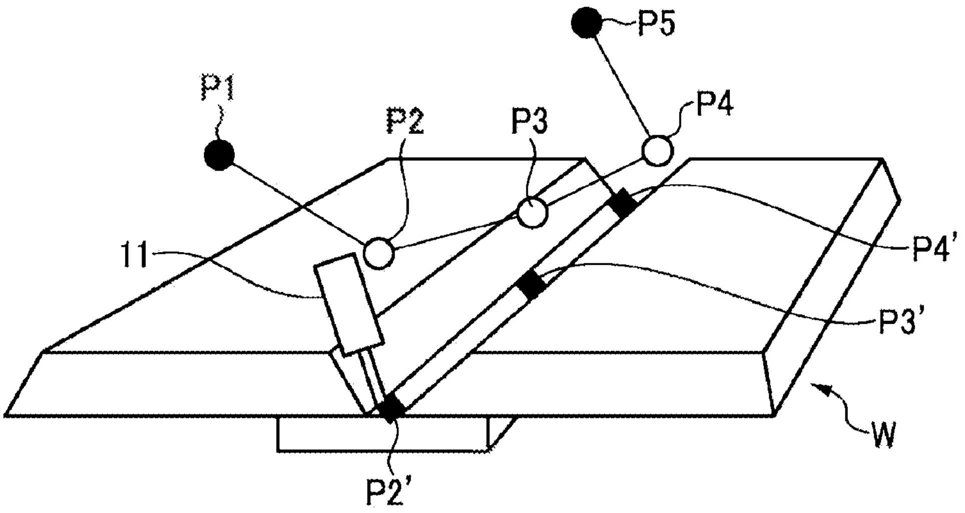
FIG. 7C is a conceptual view for explaining an adjustment process for the teaching program according to the embodiment of the present invention.

In the example of FIG. 7A, start point P1 and end point P5 are set in a certain welding section in a teaching program, and three teaching points P2 to P4 are specified therebetween. The teaching points P2 to P4 have different values from those of welding points P2' to P4' to be actually welded. Thus, in the teaching program, it is required that the values of the teaching points P2 to P4 be set to be equal to or substantially equal to those of the welding points P2' to P4'. Note that welding points P2' to P4' correspond to a central position of the groove.

First, as illustrated in FIG. 78, the welding robot 10 focuses on the teaching point P2 as the first teaching point. This corresponds to the process of S602 of FIG. 6. The operator performs the process along the flow until the process of S606, thus upon identification of the center of the groove at the position of the welding point P2' as illustrated in FIG. 7C, gives update instructions for the parameter of the teaching program, particularly, the position parameter, and updates the teaching program. Such an operation is similarly performed on the teaching points P3, P4, thus the teaching program is updated.

Thus, according to this example, work support for adjusting the parameters of the teaching program can be performed. As a result, welding with higher accuracy can be achieved.

[Modification 2]

A modification is described in which the support function for the remote operation shown in the embodiment is used for adjusting the distal end position of the welding torch 11 upon occurrence of an error in the middle of welding.

For example, when some sort of error occurs during welding, the position of the welding torch 11 needs to be moved by remote operation to a position where welding can resume. At this point, it is possible to facilitate the adjustment of the position of the welding torch 11 using the sensing process according to the above-described embodiment in order to prevent the welding torch 11 from coming into contact with or being disposed at an inappropriate position of the work.

Figure 8:
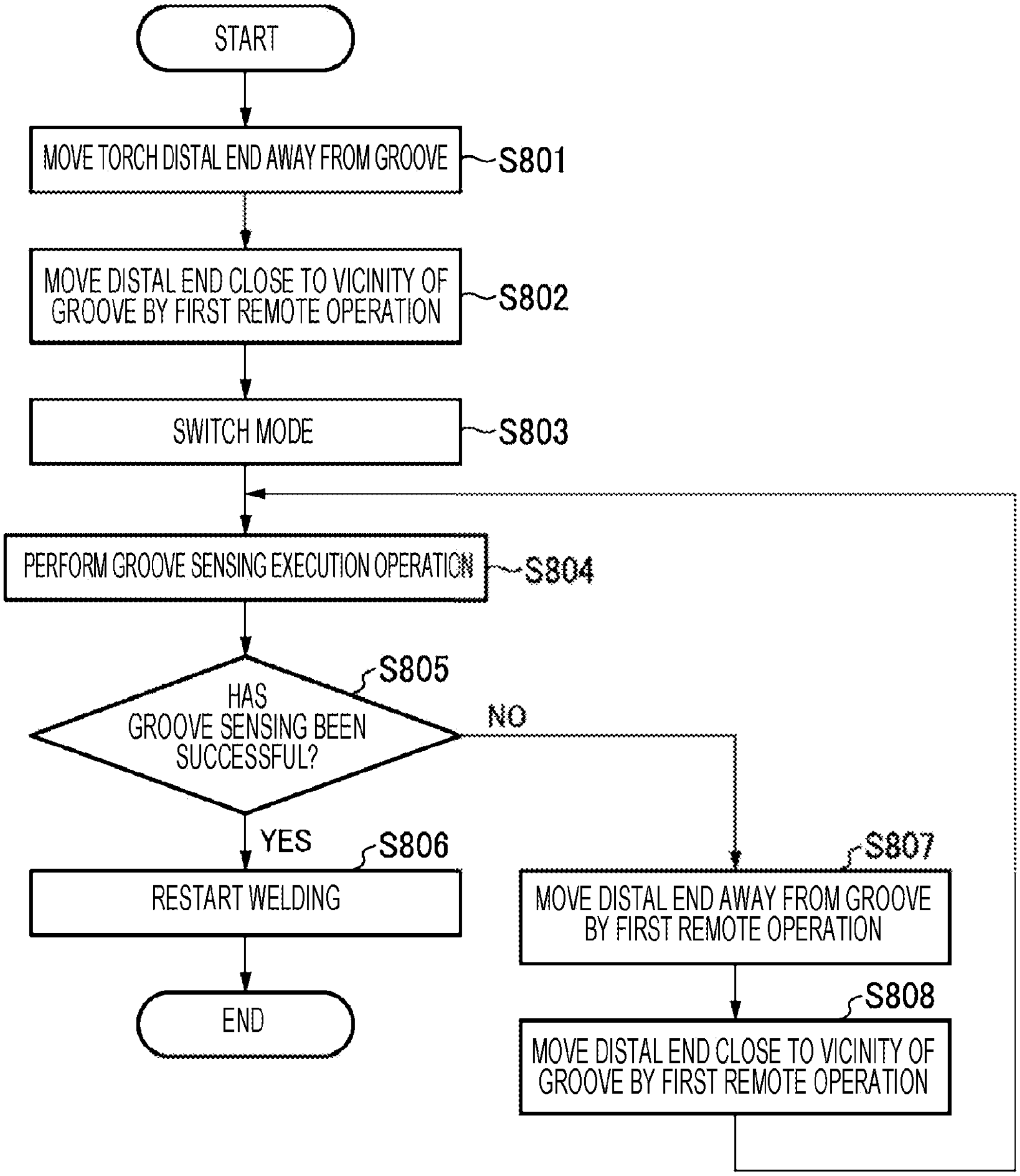
FIG. 8 is a flowchart of a groove sensing process according to the embodiment of the present invention.

FIG. 8 illustrates a flowchart for the process of adjusting the position of the welding torch 11 during welding in this example. Here, an example of detecting the position of the groove of the work W, and positioning the welding torch 11 at the groove center will be described. It is assumed that welding has been performed before the start of the process flow of FIG. 8, and some sort of error has occurred during welding, and welding is stopped. In this case, the process flow is started.

In 8801, the robot control device 20 moves the distal end of the welding torch 11 away from the work. The distal end of the welding torch 11 referred to herein indicates the distal end position of the welding wire which has been fed via the welding torch 11 and has a predetermined extension. The travel direction here may be defined in advance, or may be set according to the details of welding performed so far and the shape of the work.

In S802, the operator moves the distal end of the welding torch 11 close to the vicinity of the groove by the first remote operation via the teach pendant 60.

In S803, the robot control device 20 switches the mode based on instructions by the operator via the teach pendant 60. The mode here corresponds to the mode when the sensing operation by the above-described remote operation is performed. At this point, the robot control device 20 may notify the operator via the display of the teach pendant 60 that the mode has been switched.

In S804, the operator performs sensing in the groove by the second remote operation via the teach pendant 60. The operator attempts to move the distal end of the welding torch 11 to a central position of the groove while detecting contact with the vicinity of the groove. The move to the central position of the groove may be such that the welding torch 31 is moved based a pre-defined movement pattern, and is automatically controlled so as to approach the central position depending on the contact situation.

In S805, the operator determines whether the groove sensing has been successful. Successful groove sensing operation indicates the case where the operator determines that the distal end of the welding torch 11 is located at the center of the groove. When the groove sensing operation has been successful (YES in S805), the process of the operator proceeds to S806. Meanwhile, when the groove sensing operation has been unsuccessful (NO in S805), the process of the operator proceeds to S807.

In S806, the operator gives instructions to the robot control device 20 based on the identified position to resume welding. In addition, the robot control device 20 switches the mode changed in S803 to the mode at the time of welding.

In 6807, the operator moves the distal end of the welding torch 11 away from the vicinity of the groove by the first remote operation via the teach pendant 60. The process of the operator then proceeds to S808.

In S808, the operator moves the distal end of the welding torch 11 close to the vicinity of the groove by the first remote operation. The movement here may be based on instructions by the operator via the teach pendant 60, or may be set according to the positions and shape of the groove detected so far. The process of the operator is then returned to S804, and the sensing operation for the groove at the teaching point of current interest is repeated.

A specific description will be given with reference to FIGS. 9A to 9C according to the flow of the flowchart illustrated in FIG. 8. Here, a description will be given using an example of the work W in which a groove is provided between two members, and a backing material is disposed on the backside of the groove as illustrated in FIG. 8A.

Figure 9A:
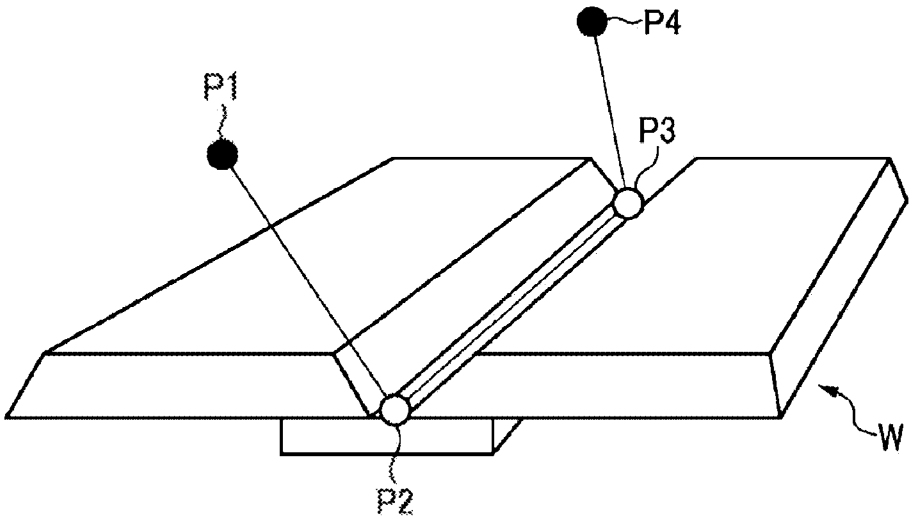
FIG. 9A is a conceptual view for explaining a groove sensing process at the time of error occurrence according to the embodiment of the present invention.

In the example of FIG. 9A, start point P1 and end point P4 are set in a certain welding section in a teaching program, and two welding points P2, P3 are specified therebetween. The welding robot 10 performs welding over the section from welding point P2 to P3 based on the teaching program.

Figure 9B:
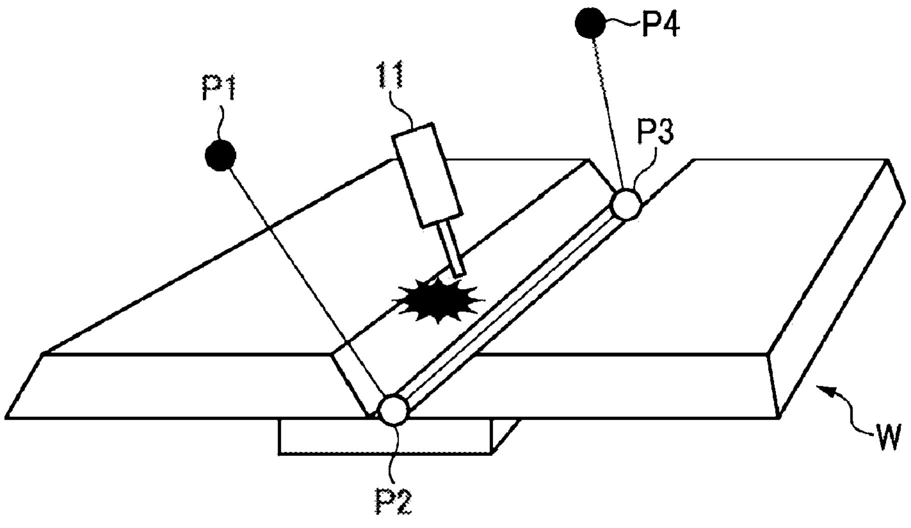
FIG. 9B is a conceptual view for explaining a groove sensing process at the time of error occurrence according to the embodiment of the present invention.
Figure 9C:
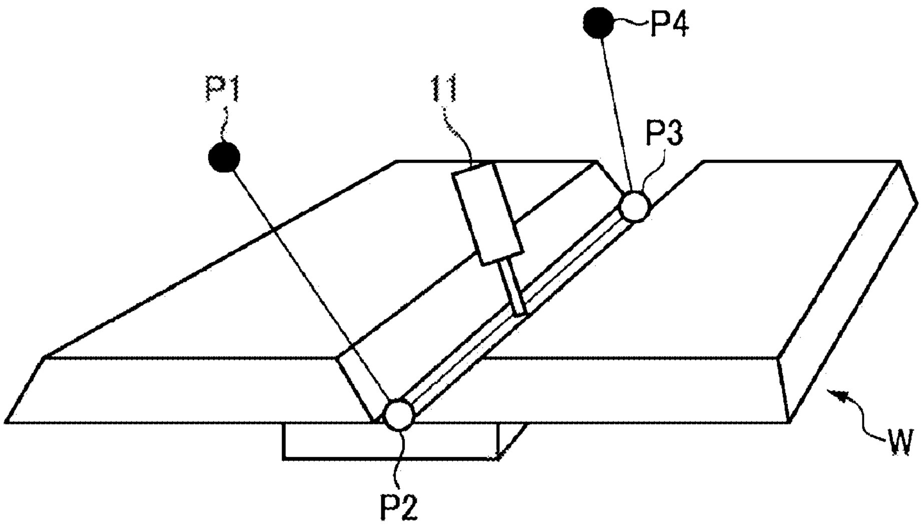
FIG. 9C is a conceptual view for explaining a groove sensing process at the time of error occurrence according to the embodiment of the present invention.

As illustrated in FIG. 9B, it is assumed that welding is stopped due to occurrence of error caused by contact between the welding torch 11 and the work W during welding. In this case, the process flow of FIG. 8 is started. As a result of the process of FIG. 8, the welding torch 11 is placed at the groove center as illustrated in FIG. 9C, and welding is resumed.

Thus, according to this example, even when welding is interrupted due to an error, it is possible to appropriately perform the support for the operation of welding by the operator by adjusting the position of the welding torch 11 using the support function according to the remote operation.

Other Embodiments

In the embodiment, when the sensing operation is performed, the welding torch 11 itself is moved, thereby detecting contact with the work W, and identifying the positional relationship therebetween. Without being limited to this configuration, and for example, the positional relationship between the welding torch 11 and the work W may be identified by adjusting the feed speed of the welding wire 13 projected from the welding torch 11, and detecting contact between the fed welding wire 13 and the work W. This configuration can be utilized, for example, when it is known that the work W is located in the extension direction of the welding wire 13.

In the embodiment, an example has been illustrated in which the robot control device 20 controls the welding torch 11 based on the remote operation performed by an operator via the teach pendant 60. In each process included in the process flow, the subject that performs the process is not necessarily limited to the one in the above configuration. For example, part of the operation described above as based on individual instructions by an operator may be automatically performed by the welding system 1.

In the present invention, programs and application for implementing the above-described one or more functions of the embodiment are supplied to a system or an apparatus using a network or a storage medium, and the one or more functions can be implemented by a process of reading and executing the programs by one or more processors in a computer of the system or the apparatus.

Alternatively, the implementation may be achieved by a circuit that implements one or more functions. Note that as the circuit that implements one or more functions, e.g., ASIC (Application Specific Integrated Circuit) and FPGA (Field Programmable Gate Array) may be mentioned.

As described above, the present specification discloses the following matters.

(1) A remote operation method for welding system enabling remote manual operation of a welding robot, the remote operation method comprising:

- a process of acquiring image data at any position using one or more imaging devices;
- a process of displaying the image data using a display device;
- a process of receiving, from an operator via an operation terminal, an instruction to execute a contact detection function by a welding torch of the welding robot; and
- an operation process of moving the welding torch during execution of the contact detection function based on the instruction given to the welding robot and received via the operation terminal.

When the welding torch detects contact with a surrounding component by the contact detection function in the operation process, a position of the welding torch is adjusted based on a position of the contact.

With this configuration, when a manual operation is performed on a welding robot installed remotely, an operator can perform various works appropriately.

(2) The remote operation method for welding system according to (1), further comprising

- an update process of receiving an update instruction to a parameter of a teaching program used in the welding system, wherein in the update process, an instruction to update a position parameter specified in the teaching program is received based on the position of the contact detected by the contact detection function.

With this configuration, even by remote operation, position adjustment of the welding robot can be made with high accuracy, and it is possible to make adjustment of the parameter of the teaching program to an appropriate position.

(3) The remote operation method for welding system according to (1) or (2), in which in the operation process, during execution of the contact detection function, at least one of a travel speed of the welding torch or a feed speed of a welding wire from the welding torch is set to a first speed.

With this configuration, during a remote operation, contact with the work can be detected using the welding torch and the feed speed of the welding wire.

(4) The remote operation method for welding system according to (3), in which the first speed is lower than a second speed when the contact detection function is not in execution.

With this configuration, during execution of the contact detection function, the speed related to detection is set low so that even if contact occurs, the control can be stopped immediately, and fine control can be performed.

(5) The remote operation method for welding system according to any one of (1) to (4), in which detection by the contact detection function is made based on a change in voltage, load, or motor load which occurs at a time of contact.

With this configuration, contact can be detected by the contact detection function based on various principles such as a change in voltage, load or motor load.

(6) The remote operation method for welding system according to any one of (1) to (5), in which during execution of the contact detection function, the operator is notified via the operation terminal or the display device that the contact detection function is in execution.

With this configuration, an operator can easily recognize that the contact detection function is not in execution, which can improve the convenience of the operation.

(7) The remote operation method for welding system according to any one of (1) to (6), in which the one or more imaging devices change an image capture position in coordination with movement of the welding torch.

With this configuration, the image capture position is changed along with the movement of the welding torch, thus the operability of the remote operation by the operator can be improved.

(8) A welding system comprising:

- a welding robot including a welding torch;
- one or more imaging devices;
- a display device; and
- an operation terminal for manually operating the welding robot remotely.

The welding system includes:

- an acquisition unit configured to acquire image data at any position using the one or more imaging devices;
- a display unit configured to display the image data using the display device;
- a receiving unit configured to receive, from an operator via the operation terminal, an instruction to execute a contact detection function by the welding torch; and
- an operation unit configured to move the welding torch based on an instruction to the welding robot received during execution of the contact detection function via the operation terminal When the welding torch detects contact with a surrounding component by the contact detection function, the operation unit adjusts a position of the welding torch based on a position of the contact.

With this configuration, when a manual operation is performed on a welding robot installed remotely, an operator can perform various works appropriately.

Although various embodiments have been described above, needless to say that the present invention is not limited to such examples. It is apparent that various modification examples and alteration examples will occur to those skilled in the art within the scope described in the appended claims, and it should be understood that those examples naturally fall within the technical scope of the present invention. In a range without departing from the spirit of the invention, the components in the above embodiments may be combined in any manner.

The present application is based on Japanese Patent Application (No. 2022-099056) filed on Jun. 20, 2022, the entire contents of which are incorporated herein by reference.

REFERENCE SIGNS LIST

1 welding system
10 welding robot
11 welding torch
12 wire feeding device
13 welding wire
20 robot control device 201 CPU
202 memory
202A control program
203 operation panel
204 robot connection section
205 communicator
30 power supply device
40 visual sensor
50 data processing device
60 teach pendant
W work

The invention claimed is:

1. A remote operation method for welding system enabling remote manual operation of a welding robot, the remote operation method comprising:

a process of acquiring image data at any position using one or more imaging devices;

a process of displaying the image data using a display device;

a process of receiving, from an operator via an operation terminal, an instruction to execute a contact detection function by a welding torch of the welding robot with a work; and an operation process of moving the welding torch during execution of the contact detection function based on the instruction received from the operator via the operation terminal, the operation process including a) moving the welding torch away from a work based on instructions from the operator by a first remote operation in which a sensing voltage is not applied to the welding torch;

b) moving the welding torch to a predetermined distance from a target position by the first remote operation;

c) stopping the first remote operation and starting a second remote operation in which the sensing voltage is applied to the welding torch;

d) moving the welding torch to contact the work by the second remote operation;

e) stopping the welding torch and confirming that the welding torch is in contact with the work;

f) determining whether a contact position of the welding torch is in a predetermined range from the target position; and g) repeating steps a)-f) when the contact position of the welding torch is not in the predetermined range from the target position, wherein a travel speed of the welding torch in the first remote operation is greater than a travel speed of the welding torch in the second remote operation.

2. The remote operation method for welding system according to claim 1, further comprising an update process of receiving an update instruction to a parameter of a teaching program used in the welding system, wherein in the update process, an instruction to update a position parameter specified in the teaching program is received based on the position of the contact detected by the contact detection function.

3. The remote operation method for welding system according to claim 1, wherein detection by the contact detection function is made based on a change in voltage, load, or motor load which occurs at a time of contact.

4. The remote operation method for welding system according to claim 1, wherein during execution of the contact detection function, the operator is notified via the operation terminal or the display device that the contact detection function is in execution.

5. The remote operation method for welding system according to claim 1, wherein the one or more imaging devices change an image capture position in coordination with movement of the welding torch.

6. A welding system comprising:

a welding robot including a welding torch;

one or more imaging devices;

a display device; and an operation terminal for manually operating the welding robot remotely, wherein the welding system includes:

an acquisition unit configured to acquire image data at any position using the one or more imaging devices, a display unit configured to display the image data using the display device, a receiving unit configured to receive, from an operator via the operation terminal, an instruction to execute a contact detection function by the welding torch with a work, and an operation unit configured to move the welding torch based on an instruction to the welding robot received during execution of the contact detection function via the operation terminal, the operation unit configured to a) move the welding torch away from a work based on instructions from the operator by a first remote operation in which a sensing voltage is not applied to the welding torch;

b) move the welding torch to a predetermined distance from a target position by the first remote operation;

c) stop the first remote operation and start a second remote operation in which the sensing voltage is applied to the welding torch;

d) move the welding torch to contact the work by the second remote operation;

e) stop the welding torch when it is confirmed that the welding torch is in contact with the work; and f) repeat steps a)-e) when it is determined that a contact position of the welding torch is not in a predetermined range from the target position, wherein a travel speed of the welding torch in the first remote operation is greater than a travel speed of the welding torch in the second remote operation.

7. The remote operation method for welding system according to claim 2, wherein detection by the contact detection function is made based on a change in voltage, load, or motor load which occurs at a time of contact.

8. The remote operation method for welding system according to claim 2, wherein during execution of the contact detection function, the operator is notified via the operation terminal or the display device that the contact detection function is in execution.

9. The remote operation method for welding system according to claim 2, wherein the one or more imaging devices change an image capture position in coordination with movement of the welding torch.

* * * * *